US010929144B2

(12) United States Patent
Ward et al.

(10) Patent No.: US 10,929,144 B2
(45) Date of Patent: Feb. 23, 2021

(54) SPECULATIVELY RELEASING STORE DATA BEFORE STORE INSTRUCTION COMPLETION IN A PROCESSOR

(71) Applicant: International Business Machines Corporation, Armonk, NY (US)

(72) Inventors: Kenneth L. Ward, Austin, TX (US); Hung Q. Le, Austin, TX (US); Dung Q. Nguyen, Austin, TX (US); Bryan Lloyd, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 67 days.

(21) Appl. No.: 16/268,688

(22) Filed: Feb. 6, 2019

(65) Prior Publication Data

US 2020/0249946 A1 Aug. 6, 2020

(51) Int. Cl.
*G06F 9/38* (2018.01)
*G06F 9/30* (2018.01)

(52) U.S. Cl.
CPC ........ *G06F 9/3857* (2013.01); *G06F 9/30043* (2013.01); *G06F 9/3836* (2013.01); *G06F 9/3842* (2013.01)

(58) Field of Classification Search
CPC .............. G06F 9/30043; G06F 9/3842; G06F 9/30087; G06F 9/3836; G06F 9/3857
See application file for complete search history.

(56) References Cited

U.S. PATENT DOCUMENTS

| 5,802,340 | A | * | 9/1998 | Mallick | ................ | G06F 9/3834 |
| | | | | | | 712/218 |
| 8,219,787 | B2 | * | 7/2012 | Lien | .................... | G06F 9/30043 |
| | | | | | | 712/219 |
| 9,003,225 | B2 | | 4/2015 | Rafacz et al. | | |
| 9,218,289 | B2 | | 12/2015 | Rychlik et al. | | |
| 9,582,276 | B2 | | 2/2017 | Meier et al. | | |
| 2003/0005263 | A1 | * | 1/2003 | Eickemeyer | .......... | G06F 9/3851 |
| | | | | | | 712/218 |
| 2006/0179174 | A1 | | 8/2006 | Bockhaus et al. | | |

(Continued)

OTHER PUBLICATIONS

Roth, A., "Store Vulnerability Window (SVW): A Filter and Potential Replacement for Load Re-Execution," Journal of Instruction Level Parallelism, vol. 8, 2006.

(Continued)

*Primary Examiner* — Aimee Li
*Assistant Examiner* — Courtney P Carmichael-Moody
(74) *Attorney, Agent, or Firm* — Scully, Scott, Murphy & Presser, P.C.

(57) ABSTRACT

A computer system, processor, and method for processing information is disclosed that includes determining whether an instruction is a designated instruction, determining whether an instruction following the designated instruction is a subsequent store instruction, speculatively releasing the subsequent store instruction while the designated instruction is pending and before the subsequent store instruction is complete. Preferably, in response to determining that an instruction is the designated instruction, initiating or advancing a speculative tail pointer in an instruction completion table (ICT) to look through the instructions in the ICT following the designated instruction.

18 Claims, 6 Drawing Sheets

(56) References Cited

U.S. PATENT DOCUMENTS

| | | | |
|---|---|---|---|
| 2006/0179346 A1* | 8/2006 | Bishop | G06F 11/1407 714/13 |
| 2008/0222395 A1* | 9/2008 | Le | G06F 9/3857 712/220 |
| 2017/0031827 A1 | 2/2017 | McCormick, Jr. | |
| 2017/0371660 A1 | 12/2017 | Smith et al. | |

OTHER PUBLICATIONS

Roth, A. et al., "Exploiting Aggressive Memory Dependence Speculation to Simplify the Store-Load Datapath," Doctoral dissertation, University of Pennsylvania, 2011.

\* cited by examiner

| STCX | Store | RTC |
|------|-------|-----|
| X | X | 1 |
| 1 | 0 | 0 |
| 0 | 0 | 1 |
| 0 | 1 | 1 |
| 0 | X | 0 |

510 → tail (row 2)
520, spec → row 3
525 (table)

Fig. 5A

| STCX | Store | RTC |
|------|-------|-----|
| X | X | 1 |
| 1 | 0 | 0 |
| 0 | 0 | 1 |
| 0 | 1 | 1 |
| 0 | X | 0 |

510 → tail (row 2)
520, spec → row 4

Fig. 5B

| STCX | Store | RTC |
|------|-------|-----|
| X | X | 1 |
| 1 | 0 | 0 |
| 0 | 0 | 1 |
| 0 | 1 | 1 |
| 0 | X | 0 |

510 → tail (row 2)
520, spec → row 5

SPECULATIVELY RELEASING STORE DATA BEFORE STORE INSTRUCTION COMPLETION IN A PROCESSOR

BACKGROUND OF INVENTION

The present invention generally relates to information handling and data processing systems, processors, and more specifically to out-of-order processors.

Modern information and data handling systems often execute instructions out of order to achieve greater processing efficiency. Processors typically are "pipelined" to handle executing instructions out-of-order and have multiple elements that operate in parallel to process multiple instructions in a single processing cycle. Pipelining involves processing instructions in stages, so that the pipelined stages may process a number of instructions concurrently. Executing instructions out-of-order creates additional complexity in handling and processing instructions. Depending upon how the instructions are handled in out-of-order processors, processor latency and inefficiency may result.

Typically, the processor includes a number of stages, and the various stages may include an "instruction fetch" stage where an instruction is fetched from memory. In a "decode" stage, the instruction is decoded into different control bits, which in general designate (i) a type of functional unit (e.g., execution unit) for performing the operation specified by the instruction, (ii) source operands for the operation, and (iii) destinations for results of the operation. In a "dispatch" stage, the decoded instruction is dispatched to an issue queue (ISQ) where instructions wait for data and an available execution unit. Next, an instruction in the issue queue (ISQ) typically is issued to an execution unit in an "execution" stage. The "execution" stage processes the operation as specified by the instruction. Executing an operation specified by an instruction typically includes accepting data, e.g., one or more operands, and producing one or more results. There are usually registers and queues associated with the execution units and/or the issue queue (ISQ) to hold data, information and/or instructions for the execution units.

In modern computer architecture, there are several known ways to design a computer adapted to perform more than one instruction at a time, or at least in the same time frame. For example, such a computer may include more than one processor core (i.e., central processing unit) and each processor core may be capable of acting independently of other processor cores. This may allow for true multitasking, with each processor core processing a different instruction stream in parallel with the other processor cores of the computer. Another design to improve throughput may be to include multiple hardware threads within each processor core, with the threads sharing certain resources of the processor core. This may allow each processor core to take advantage of thread-level parallelism. To handle multiple threads in each processor core, a processor core may have multiple execution slices. An execution slice may refer to a set of data processing circuitry or hardware units connected in series within a processor core. An execution slice may be a pipeline or pipeline-like structure. Multiple execution slices may be used as part of simultaneous multi-threading within a processor core.

SUMMARY

The summary of the disclosure is given to aid understanding of a computer system, computer architectural structure, processor, store queues, and method of using store queues and operations in a processor, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, store queues, and their method of operation to achieve different effects.

In one or more embodiments, a method of processing data in a processor is disclosed that includes determining whether an instruction is a designated instruction, determining whether an instruction following the designated instruction is a subsequent store instruction, speculatively releasing the subsequent store instruction while the designated instruction is pending and before the subsequent store instruction is complete. Preferably, in response to determining that an instruction is the designated instruction, initiating or advancing a speculative tail pointer in an instruction completion table (ICT) to look through the instructions in the ICT following the designated instruction. In an aspect, the method further includes determining whether the designated instruction is ready-to-complete (RTC), and in response to the designated instruction being RTC, stop speculatively releasing store instructions, and in response to the designated instruction not being RTC, initiate speculative releasing subsequent store instructions.

In an embodiment, the method further includes determining whether the store instruction following the designated instruction is RTC, and in response to the store instruction not being RTC wait until the store instruction is RTC, and in response to the store instruction being RTC, report the number of store instructions to the LSU, and speculatively release those store instructions from a store queue. And, in an aspect, the subsequent store instruction does not deallocate its entry in a store queue until the store operation corresponding to the subsequent store instruction has drained out to memory. The method according to a further example includes determining whether the instruction pointed to by the speculative tail pointer is a second designated instruction, and in response to the speculative tail pointer pointing to a second designated instruction, stop the speculative process, and in response to the speculative tail pointer not pointing to a second designated instruction, continue the speculative process.

In another embodiment, a computer system for processing information is disclosed, the computer system including at least one computer processor having: a Dispatch Unit for dispatching instructions; a store queue for receiving store instructions, the store queue having a plurality of entry locations for storing data; and an Instruction Completion Table (ICT) having a plurality of instruction entries, the ICT for tracking the progress of instructions processed by the processor and to identify instructions that are ready-to-complete (RTC), the ICT having a completion tail pointer to identify the next-to-complete (NTC) instruction entry and a speculative tail pointer to look through the ICT instruction entries after the NTC instruction. In an aspect the processor is configured to speculatively release store instructions from the store queue while a first designated instruction is pending in the ICT, and before the store instruction is complete. In an embodiment, the processor is configured to determine whether the designated instruction is ready to complete (RTC), and in response to the designated instruction being RTC, stop speculatively releasing the store instructions, and in response to the designated instruction not being RTC, initiate the speculatively releasing process.

In a further embodiment, a computer system for processing information is disclosed where the computer system has at least one processor; a Dispatch Unit for dispatching instructions; an Issue Unit for receiving instructions dispatched from the Dispatch Unit and for issuing instructions; a store queue of an execution unit for receiving store instructions issued from the Issue Queue, the queue having a plurality of entry locations for storing data; an Instruction Completion Table (ICT) having a plurality of instruction entries, the ICT for tracking the progress of instructions processed by the processor and to identify instructions that are ready-to-complete (RTC), the ICT having a completion tail pointer to identify the next to complete (NTC) instruction entry and a speculative tail pointer to look through the ICT instruction entries after the NTC instruction; one or more computer readable non-transitory storage media; and programming instructions stored on the one or more computer readable non-transitory storage media for execution by the at least one processor. The processor includes in an aspect programming instructions to speculatively release store instructions from the store queue before the store instruction is complete and while a first designated instruction is pending in the ICT. The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features, and/or embodiments of the information handling system, computer system, computer architectural structure, processor, queues (e.g., store queues), and their method of operation will be better understood when read in conjunction with the figures provided. Embodiments are provided in the figures for the purpose of illustrating aspects, features, and/or various embodiments of the computer system, computer architectural structure, processor, queues, (e.g., store queues) and their method of operation, but the claims should not be limited to the precise arrangement, structures, features, aspects, embodiments, and/or devices shown, and the arrangements, structures, subassemblies, features, aspects, methods, processes, embodiments, methods, and/or devices shown may be used singularly or in combination with other arrangements, structures, subassemblies, features, aspects, embodiments, methods, and/or devices.

DETAILED DESCRIPTION

The following description is made for illustrating the general principles of the invention and is not meant to limit the inventive concepts claimed herein. In the following detailed description, numerous details are set forth in order to provide an understanding of the information handling system, computer system, computer architectural structure, processor, memory, execution units such as, for example, a load store unit (LSU), load queues (LDQ), and store queues, (STQ), and their method of operation, however, it will be understood by those skilled in the art that different and numerous embodiments of the computer system, computer architectural structure, processor, load store unit (LSU), load and store queues, and their method of operation may be practiced without those specific details, and the claims and invention should not be limited to the embodiments, subassemblies, features, processes, methods, aspects, features or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising" when used in this specification, specify the presence of stated features, integers, steps, operations, elements, and/or components, but do not preclude the presence or addition of one or more features, integers, steps, operations, elements, components, and/or groups thereof.

The following discussion omits or only briefly describes conventional features of information processing systems, including processors and microprocessor systems and architecture, which are apparent to those skilled in the art. It is assumed that those skilled in the art are familiar with the general architecture of processors, and in particular with processors which operate in an out-of-order execution fashion, including multi-slice processors and their use of execution units such as load store units (LSUs), and store queues. It may be noted that a numbered element is numbered according to the figure in which the element is introduced, and is typically referred to by that number throughout succeeding figures.

Figure 1:
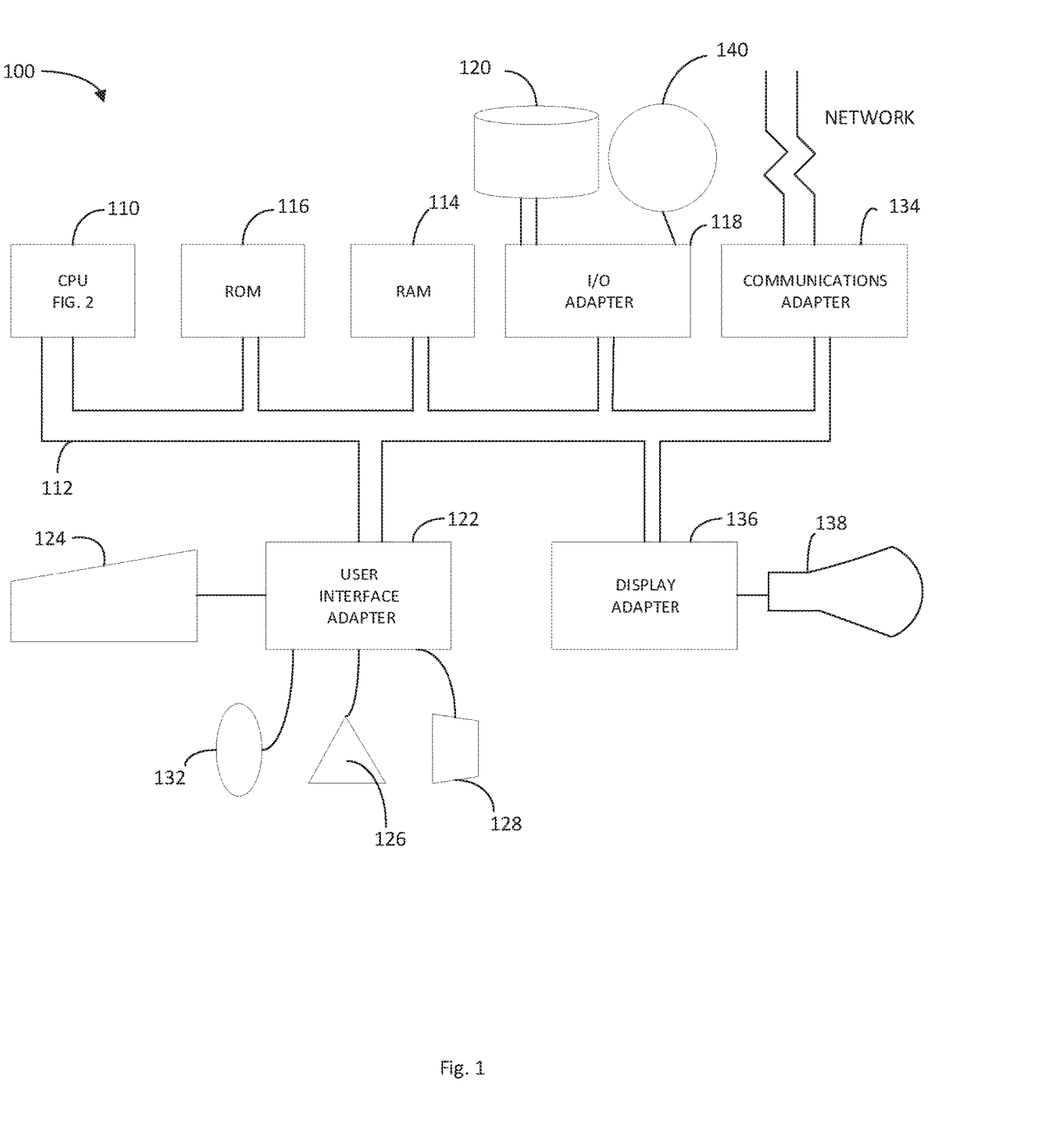
FIG. 1 illustrates an example of a data processing or information handling system in which aspects of the present disclosure may be practiced.

FIG. 1 illustrates an example of a data processing system 100 in which aspects of the present disclosure may be practiced. The system has a central processing unit (CPU) 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. Processor 110 may have a bus interface unit coupled to the bus 112 for controlling transfers of data and instructions between memory, such as, for example, random access memory 114, and caches, e.g. instruction cache (I-Cache) and data cache (D-Cache). Data cache and instruction cache may each have various levels of cache, such as, for example, L1 cache, L2 cache, and/or L3 cache.

I/O adapter 118 may be a small computer system interface ("SCSI") adapter that communicates with a disk storage device 120. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system through the keyboard 124, trackball 132 or mouse 126 and receiving output from the system via speaker 128 and display 138. Additionally, an operating system such as, for example, AIX ("AIX" is a trademark of the IBM Corporation) is used to coordinate the functions of the various components shown in FIG. 1.

The CPU (or "processor") 110 includes various logic units, functional units, registers, buffers, memories, and other units formed by integrated circuitry, and may operate according to reduced instruction set computing ("RISC") techniques. The CPU 110 processes according to processor cycles, synchronized, in some aspects, to an internal clock (not shown).

Figure 2:
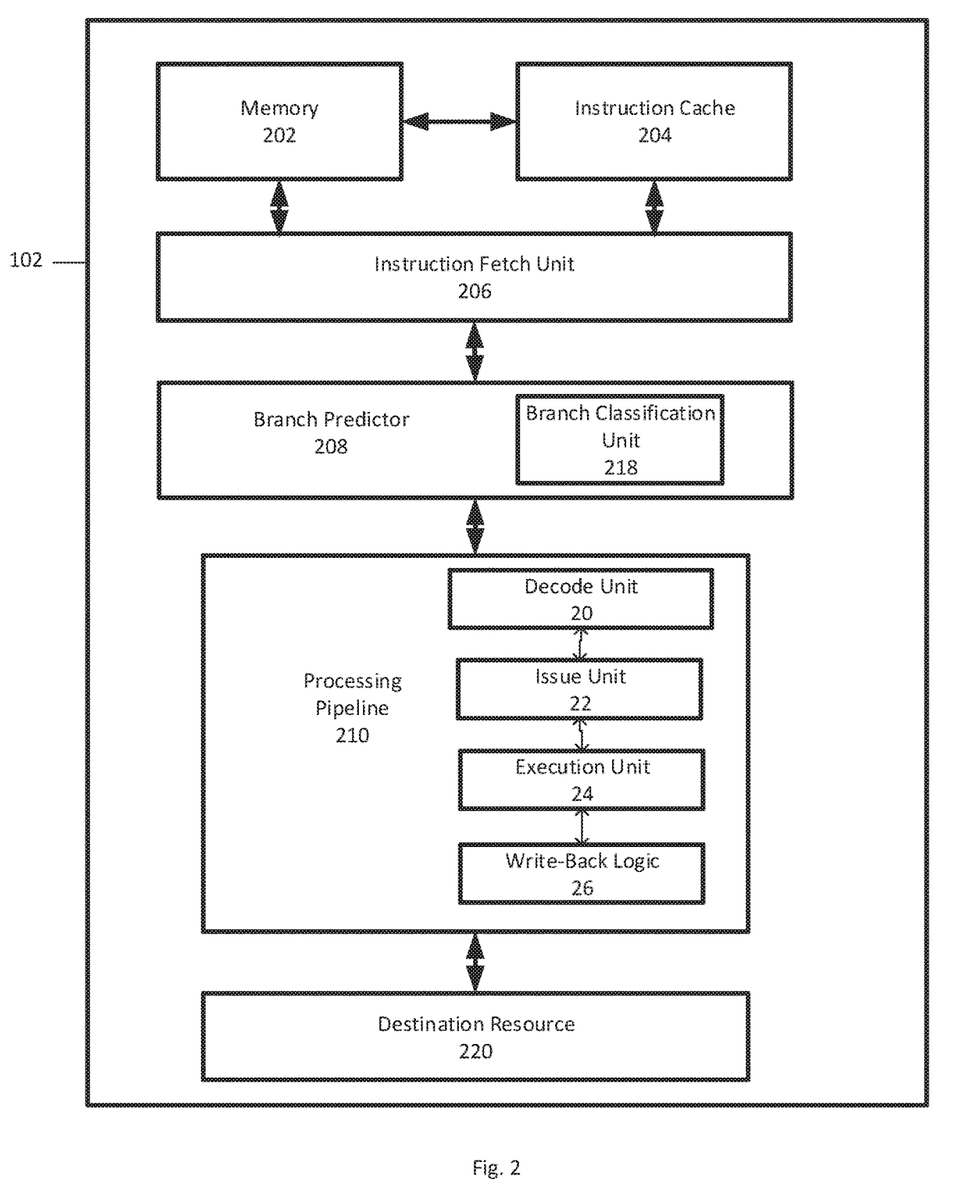
FIG. 2 illustrates a block diagram of a processor in which certain aspects of the present disclosure may be practiced.

FIG. 2 depicts a block diagram of a processor 110 according to an embodiment. The processor 110 includes memory 202, instruction cache 204, instruction fetch unit 206, branch predictor 208, branch classification unit 218, processing pipeline 210, and destination resource 220. The processor 110 may be included within a computer processor or otherwise distributed within a computer system. Instructions and data can be stored in memory 202, and the instruction cache 204 may access instructions in memory 202 and store the instructions to be fetched. The memory 202 may include any type of volatile or nonvolatile memory, such as cache memory and can include instruction cache 204. The memory 202 and instruction cache 204 can include multiple cache levels. A data cache (not depicted) may also be included in the processor 102, and in memory 202.

In FIG. 2, a simplified example of the instruction fetch unit 206 and the processing pipeline 210 are depicted. In various embodiments, the processor 110 may include multiple processing pipelines 210 and instruction fetch units 206. In an embodiment, the processing pipeline 210 includes a decode unit 20, an issue unit 22, an execution unit 24, and write-back logic 26. The instruction fetch unit 206 and/or the branch predictor 208 may also be part of the processing pipeline 210. The processing pipeline 210 may also include other features, such as error checking and handling logic, reorder buffer, one or more parallel paths through the processing pipeline 210, and other features now or hereafter known in the art. While a forward path through the processor 110 is depicted in FIG. 2, other feedback and signaling paths may be included between elements of the processor 110. The processor core may include other circuits, functional units, and components.

The instruction fetch unit 206 fetches instructions from the instruction cache 204 according to an instruction address, for further processing by the decode unit 20. The decode unit 20 decodes instructions and passes the decoded instructions, portions of instructions, or other decoded data to the issue unit 22. The decode unit 20 may include a dispatch unit to dispatch instructions to the issue unit 22. The decode unit 20 may also detect branch instructions which were not predicted by branch predictor 208. The issue unit 22 analyzes the instructions or other data and transmits the decoded instructions, portions of instructions, or other data to one or more execution units 24 in the pipeline 210 based on the analysis. The execution unit 24 performs and executes operations specified by the instructions issued to the execution unit 24. The execution unit 24 may include a plurality of execution units, such as fixed-point execution units, floating-point execution units, load/store execution units, and vector multimedia execution units. Execution unit 24 in addition, in embodiments, determines if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded (e.g., flushed) from the various units of processor 110.

The write-back logic 26 writes results of instruction execution back to a destination resource 220. The destination resource 220 may be any type of resource, including registers, cache memory, other memory, I/O circuitry to communicate with other devices, other processing circuits, or any other type of destination for executed instructions or data. One or more of the processor pipeline units may also provide information regarding the execution of conditional branch instructions to the branch predictor 208.

Instructions may be processed in the processor 110 in a sequence of logical, pipelined stages. However, it should be understood that the functions of these stages may be merged together so that this particular division of stages should not be taken as a limitation, unless such a limitation is clearly indicated in the claims herein. Indeed, some of the stages are indicated as a single logic unit in FIG. 2 for the sake of simplicity of understanding, and further detail as relevant will be provided below.

In certain aspects, a CPU 110 may have multiple execution/processing slices with each slice having one or more of the units shown in FIG. 2. For example, each processing slice may have its own processing pipeline 210 with functional/execution units 24. A CPU 110 having multiple processing slices may be capable of executing multiple instructions simultaneously, for example, one instruction in each processing slice simultaneously in one processing cycle. Such a CPU having multiple processing slices may be referred to as a multi-slice processor or a parallel-slice processor. In an example, each processing slice may be an independent processor (e.g., processor 110) and may execute instructions independently of other processing slices in the multi-slice processor.

In certain aspects, the slices of the multi-slice processor may be configured to simultaneously execute independent threads (e.g., one thread per slice) in a simultaneous multi-threading mode (SMT). Thus, multiple threads may be simultaneously executed by the multi-slice processor. Simultaneous processing in multiple slices may considerably increase processing speed of the multi-slice processor. In single-thread (ST) mode a single thread is processed, and in SMT mode, two threads (SMT2) or four threads (SMT4) are simultaneously processed.

Figure 3:
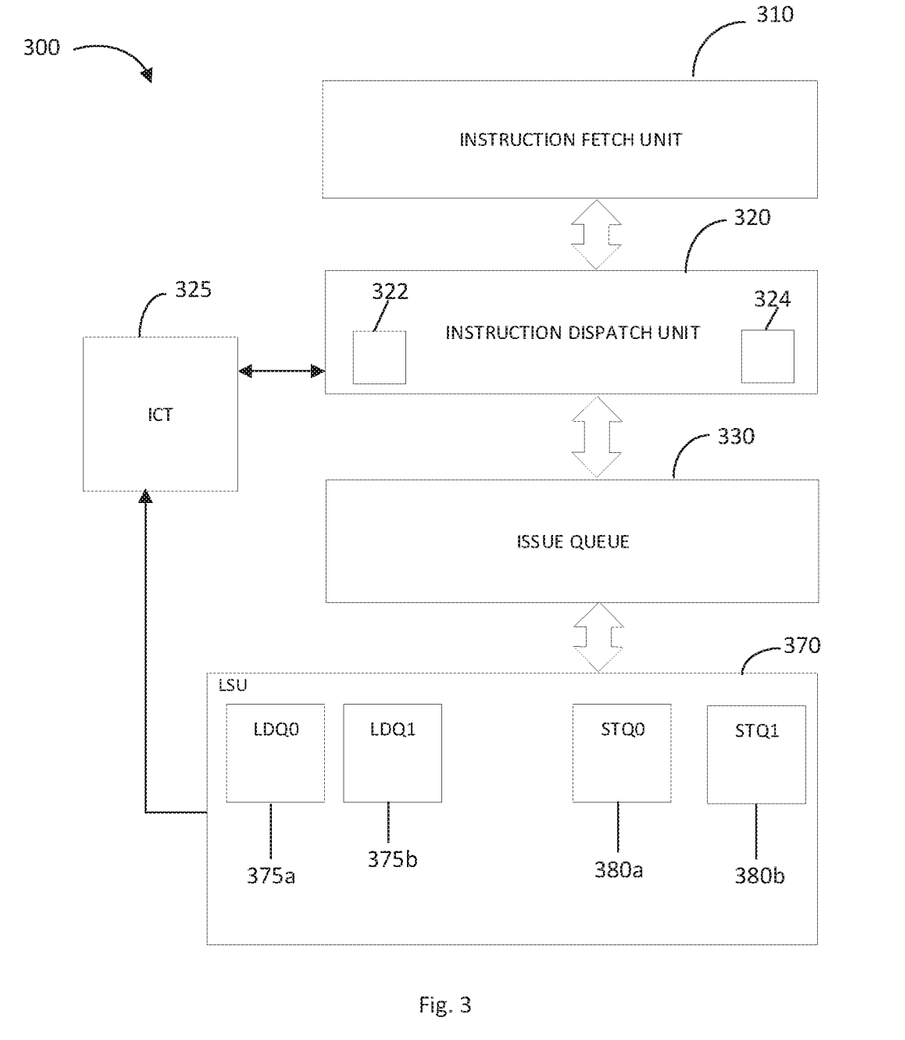
FIG. 3 illustrates a block diagram of a multi-slice processor in accordance with an aspect of the disclosure in which certain aspects of the present disclosure may be practiced.

FIG. 3 illustrates a block diagram of a portion of a processor 110. The pipeline 300 in the processor 110 in FIG.

3 includes Instruction Fetch Unit 310, Instruction Dispatch Unit 320, Issue Queue (ISQ) 330, Instruction Completion Table (ICT) 325, and Load Store Unit (LSU) 370. The LSU 370 includes one or more load queues (LDQ) 375 that hold load instructions for execution by LSU 370, and one or more store queues (STQ) 380 that hold store instructions for execution by LSU 370. In the embodiment of FIG. 3, the load queue 375 has two load queues LDQ0 (375*a*) and LDQ1 (375*b*), and the store queue 380 has two store queues, STQ0 (380*a*) and STQ1 (380*b*). More or less load queues 375 and/or store queues 380 may be present in LSU 370, and the load queues (LDQ) and store queues (STQ) may be designed and configured to have varying amounts of entries. For example, in an embodiment, load queues (LDQ) 375 may have m entries, e.g., sixty-four (64) entries, while in an embodiment, store queues (STQ) 380 may have n entries, e.g., forty (40) entries. In an embodiment more or less load queue (LDQ) entries and store queue (SDQ) entries may be provided.

The Instruction Fetch Unit 310 fetches instructions to be executed by the processor 110 or processor slice and sends them to the Instruction Dispatch Unit 320. The Instruction Dispatch Unit 320 dispatches instructions to the Issue Queue (ISQ) 330, typically in program order. The Issue Queue (ISQ) 330 in an embodiment will issue load instructions and store instructions to the LSU 370, and more particularly will issue load instructions to the load queue (LDQ) 375 and store instructions to the store queue (STQ) 380 in the LSU 370. The ISQ 330 typically holds an instruction until data associated with the instruction has been retrieved and ready for use. A register file (not shown) may serve to store data to be used in an operation specified in an instruction dispatched to an execution slice, and the result of the operation performed by execution units, e.g., LSU 370, may be written to the designated target register in the register file.

When data has been retrieved and placed in the register file or cache, e.g., L1 or L2 cache, associated with the processor, the Issue Queue 330 will issue the instruction to the execution unit, e.g., LSU 370, for execution. Issue Queue 330 typically issues the instruction to the execution unit if an entry in a queue of the execution unit is available, e.g., if the store queue (STQ) in the LSU has an available entry. When data is not ready, e.g., not within the appropriate data cache or register file, delay can result as the ISQ 330 will not issue the instruction to the execution unit. For at least this reason, the Issue Queue (ISQ) typically issues instructions, e.g., load instructions and store instructions, to the execution units, e.g., LSU 370, out-of-order so instructions where the required data is available can be executed.

Dispatch Unit 320 will stamp each store instruction dispatched to the Issue Queue 330 with a store tag (stags) to identify the row (location, entry) in the store queue (STQ) 380 where the store instruction will reside. The store instructions (stags) are allocated (assigned) and stamped in ascending program order on a per thread basis by the Dispatch Unit 320. The instructions residing in the store queue (STQ) are referred to or identified by their store tags or stags. Referring back to FIG. 3, Dispatch Unit 320 also contains and maintains a per thread store instruction counter 324 that increments for each store instruction in a thread that is dispatched to the Issue Queue 330, up to a maximum number of store instructions for that thread have been allocated for or placed into the store queue 380 in the LSU 370. The store instruction counter starts at zero (0) and counts up incrementing by one for each store instruction (stag) that the Dispatch Unit dispatches to the Issue Queue until the number of entries in the store queue (STQ) is reached.

If an entry is available in the store queue (STQ) to receive an instruction, then the Issue Queue (ISQ) will issue that instruction to the store queue (STQ). Instructions are not issued to the store queue (STQ) in the LSU until the corresponding entry in the store queue (STQ) is released (deallocated). Once the number of store instructions (e.g., rstags) that can fit into the STQ 380 have been dispatched by the Instruction Dispatch Unit, the Instruction Dispatch Unit 320 stalls at the next store instruction until the STQ 380 in an aspect has deallocated a store instruction entry in the STQ 380.

When LSU 370 is available it will execute the store instructions in the store queue (STQ) 380. The LSU 370 executes store instructions out of order and when the LSU 370 finishes a store instruction, the LSU 370 will report the finished store instruction, e.g., stag, to Instruction Completion Table (ICT) 325. The store instruction executed by the LSU 370 typically involves storing data, information, and/or operands in memory, for example, L1 and/or L2 cache. The store instruction in the store queue (STQ) 380 may be considered finished based upon various criteria, including, for example, after the LSU drains the result of the store instruction (e.g., the store) into memory, e.g., L1 and/or L2 cache.

The ICT 325 contains a queue of the instructions dispatched by the Dispatch Unit 320 and tracks the progress of the instructions as they are processed. In an embodiment, the ICT 325 has a per thread completion tail pointer that keeps track of the progress of executing the instructions in the thread, e.g., a pointer that points to the next-to-complete (NTC) instruction in the thread. The ICT may store and track information on the instructions processed by the processor, including, for example, the type of instruction, whether the instruction is finished, whether the instruction is ready-to-complete (RTC), and/or other information.

Typically, the ICT 325 completes the store instructions (stags) in order and informs the STQ 380 when the store instruction is complete. The STQ 380 receives a signal that the store instruction is complete, and then, in an embodiment, the STQ 380 typically deallocates the store queue (STQ) entry. The store queue (STQ) 380 detects when a store instruction releases and/or deallocates and informs the Dispatch Unit 320 that the entry in the store queue (STQ) is available. To decrease latency and increase processor efficiency it can be beneficial in embodiments to release entries in the store queue (STQ) 380 as soon as possible to make room in the store queue (STQ) 380 so that further store instructions can be issued to the store queue (STQ) 380 without delay.

Disclosed is a technique, method, system, and/or processor for speculatively releasing (deallocating) entries in a store queue (STQ), preferably a LSU store queue. This disclosure speeds up the release of store queue entries, e.g., STQ entries, compared to traditional designs by utilizing one or more disclosed techniques, methods, configurations, systems, processor architectures, logic programming, and/or embodiments to decrease latency and increase the efficiency of a processor. More particularly, a technique, method, system, and/or processor is disclosed for speculatively releasing store instructions in a store queue (STQ) after the processor recognizes one or more instructions, e.g., a synchronizing instruction, such as, for example, a STCX or a HWSYNC instruction, as a triggering or designated instruction. In an aspect, in response to one or more types of instructions, e.g., a triggering or designated instruction, the ICT stalls, pauses, and/or stops while waiting for a response, e.g., pass/fail/acknowledge response, from the execution unit, e.g., LSU, with respect to the designated or triggering instruction. That is, the completion tail pointer in the ICT stalls, pauses, and/or stops at the next-to-complete (NTC) instruction in response to the next-to-complete (NTC) instruction being a certain type of instruction, e.g., a designated or triggering instruction. In other words, the ICT stops completing instructions at a designated or triggering instruction while it waits for a response from the execution unit (LSU), e.g., while it waits for a pass/fail response, and/or an acknowledge response, from the LSU. In an embodiment, the ICT waits for a pass or fail response from the LSU in response to a STCX instruction, and in an additional, and/or alternative embodiment, waits for an acknowledge response from the LSU in response to a HWSYNC instruction.

While the ICT is stalled, paused, and/or stopped and the triggering or designated instruction is pending in the LSU, the processor allows store instructions, after the certain type or designated instruction, to be drained via a store release interface. That is, in an embodiment, store instructions after the designated or triggering instruction are released to the LSU and the LSU executes the stores, and the stores are drained to, for example, memory (e.g., cache), and the entry in the store queue (STQ) is deallocated while the ICT waits for a response from the execution unit, e.g., the LSU, as to the status of the triggering or designated instruction. The technique, method, system, and/or processor in an embodiment allows store instructions after the designated or triggering instruction to be speculatively released from the store queue and deallocate while the designated or triggering instruction(s) are still pending in the ICT. In an embodiment, the store operations executed by the LSU are drained to L1 and/or L2 memory cache before the stores are completed by the ICT, and the stores in an aspect are tracked speculatively in the L1 and/or L2 cache. By speculatively draining the stores, entries in the store queue (STQ) are freed up, e.g., entries are deallocated, so further instructions from the Issue Queue can be issued to the store queue (STQ).

In one or more embodiments, the speculative release and execution of store instructions while the ICT waits for a response from the execution unit, e.g., the LSU, does not progress past certain instructions following the triggering or designated instruction. For example, in or more embodiments, the releasing of stores after a triggering or designated instruction will not proceed past a second designated or triggering instruction, a stop code, and/or a branch instruction. Where the speculative release of stores stops because of a subsequent instruction type, in an embodiment, the processor waits for the first designated instruction to finish and be ready-to-complete (RTC).

In one or more embodiments, in response to the first triggering or designated instructions being finished and RTC, the processor can undergo one or more responses. In one example, if the response from finishing the triggering or designated instruction is what was expected and does not indicate a problem or failure in the processing of data, then the triggering or designated instruction can complete and the completion tail pointer in the ICT advances to the next instruction in the ICT, and the speculative release of stores can begin again. For example, if a STCX instruction received a pass response, the STCX instruction completes, and/or a HWSYNC instruction, for example, receives the expected acknowledge signal, then the HWSYNC instruction completes. In a second example, if the response to the triggering or designated instruction indicates a failure or a problem, then in an aspect the processor may undergo a flushing process as described below.

In an embodiment, the designated instructions that in an embodiment triggers speculatively releasing stores in the store queue, includes a synchronizing instruction, for example, an instruction that synchronizes the operations of the processor, or checks on the status of the processing. Examples of triggering instructions include a STCX instruction or a HWSYNC instruction. A STCX instruction is a store instruction that can exist as a byte, half-word, word, or double word forms where the store instruction is conditional. A HWSYNC instruction is a sync instruction that typically creates a memory barrier. Other types of instructions are contemplated that would benefit (permit) the processor to speculatively release store instructions.

In an embodiment, a new speculative tail pointer per thread is added to the ICT. A read port per thread in an embodiment is added to the ICT which is addressed by the speculative tail pointer so that the speculative tail pointer can step through the ICT looking at entries/instructions in the ICT, e.g., branch instructions, store instructions, and ready-to-complete (RTC) instructions.

Figure 4:
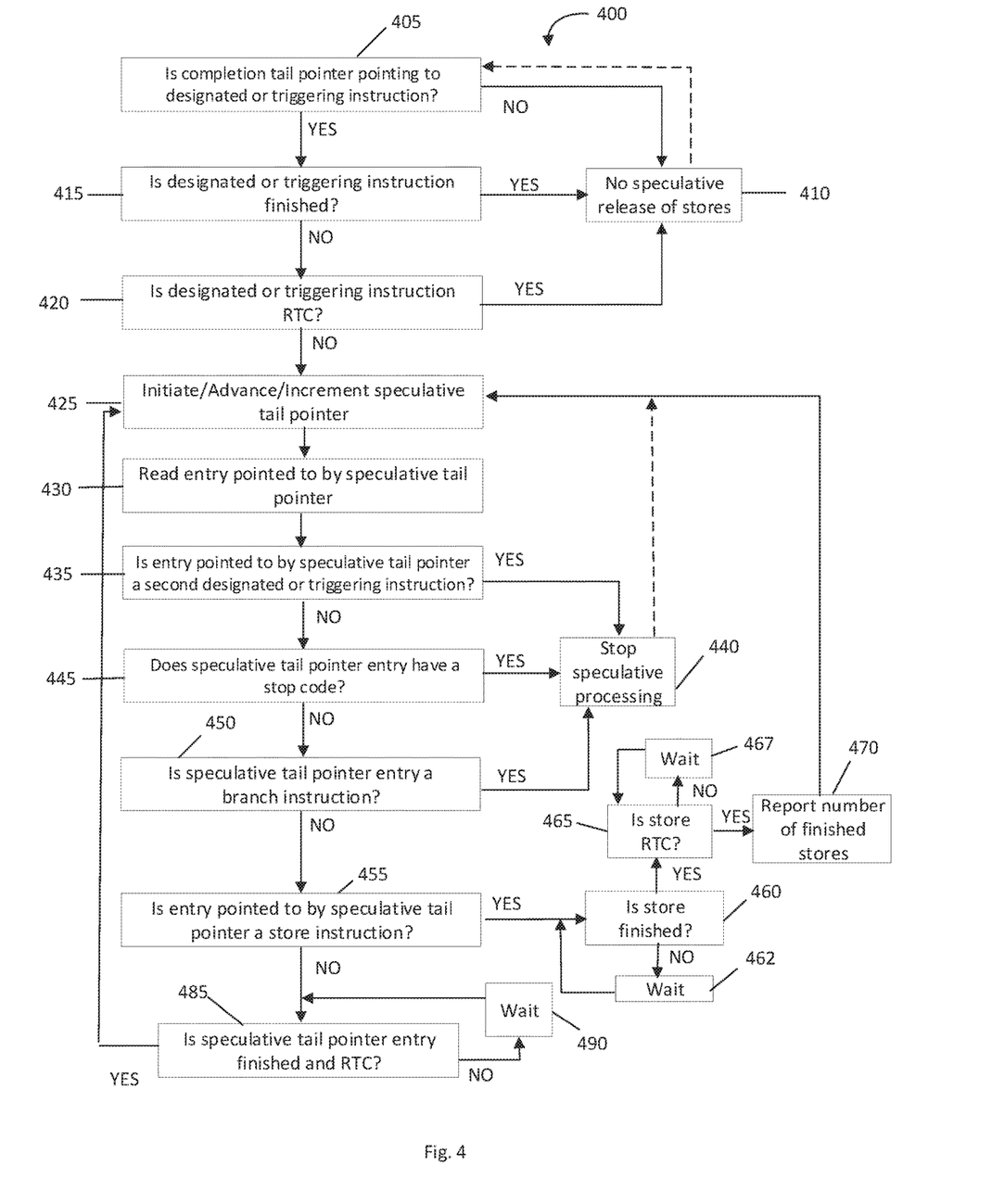
FIG. 4 illustrates a flow chart of an illustrative method of processing or handling data in a processor, and in an embodiment of speculatively releasing store instruction from a store queue in a load store execution unit.

FIG. 4 is an exemplary flowchart in accordance with one embodiment illustrating and describing a method of handling instructions in an information handling system, and more specifically a method of speculatively releasing store instructions from a store queue (STQ) and/or speculatively releasing or draining stores to memory, e.g., L1 and/or L2 cache, during a process, for example, in a processor, in accordance with an embodiment of the present disclosure. While the method 400 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 4, but the process may be integrated and/or one or more steps may be performed together, simultaneously, or the steps may be performed in the order disclosed or in an alternate order.

A method 400 of handling instructions in a processor is illustrated in FIG. 4, and more specifically, in an embodiment, a method of releasing store instructions in a processor, and/or speculatively releasing stores in a store queue in an LSU execution unit to decrease latency. At 405 it is determined whether or not the completion tail pointer in the ICT is pointing at a designated or triggering instruction. The designated or triggering instruction starts or triggers the method of releasing and/or speculatively releasing stores in a store queue. In a further embodiment, the method 400 includes speculatively draining stores to memory, e.g., L1 and/or L2 cache. The designated instruction can be a synchronizing instruction or other type of instruction, and can be a specific instruction. In an embodiment, the triggering or designated instruction is a STCX and/or HWSYNC instruction. If the next-to-complete instruction is not a designated or triggering instruction at 405, e.g., the completion tail pointer is not pointing at a designated or triggering instruction (405: No), then at 410 the process 400, e.g., speculative release of stores, does not start, and the processor continues and waits until the completion tail pointer advances to the next-to-complete (NTC) instruction in the processor, and the processor and process 400 starts over and determines whether the next-to-complete (NTC) instruction is a designated or triggering instruction.

If at 405, the completion tail in the ICT is pointing to a designated or triggering instruction (405: Yes), then the process moves to step 415, and in an embodiment the release process and/or speculate release process initiates. At 415 it is determined whether the designated or triggering instruction is finished. If at 415, the designated or triggering instruction is finished (415: Yes), then the process 400 stops at 410 and there are no store instructions to release, e.g., speculatively release. The process 400 then waits until the completion tail pointer advances to the next-to-complete (NTC) instruction in the ICT and process 400 starts over. If at 415 the designated or triggering instruction is not finished (415: No), then the process continues to 420.

At 420 it is determined whether or not the triggering or designated instructions is ready-to-complete (RTC), and if so (420: Yes), then the speculative process 400 proceeds to 410 where the process 400 stops. After 410 where the release process 400 stops, the processor continues operations and the completion pointer in the ICT advances to the NTC instruction in the ICT and the processor loops back and looks again for a triggering (designated) instruction at 405. If at 420 the triggering or designated instruction is not RTC (420: No), then the method proceeds to 425.

At 425, the speculative tail pointer is initiated, advanced, and/or incremented to the next entry in the ICT. In an embodiment where the speculative process at 425 follows the process steps 405, 415, and/or 420, and the speculative process just initiated, the speculative tail pointer is incremented in the ICT to the entry after the designated or triggering instruction (e.g., the instruction after the ICT completion pointer). In an embodiment, the speculative tail pointer can be initiated at 405, 415, 420, or 425. If the speculative tail pointer is initiated at 405, 415, or 420, the speculative tail pointer can start at the entry in the ICT where the instruction completion tail pointer resides, e.g., at the triggering instruction, and is incremented at 425 to the next ICT entry, or, in an embodiment, the speculative tail point initiates at 425 at the entry in the ICT after the triggering instruction (e.g., the instruction after the completion tail pointer).

At 430, the ICT entry pointed to by the speculative tail pointer is read and the process continues to 435. At 435 it is determined whether the entry in the ICT pointed to by the speculative tail pointer, e.g., the entry read at 430, is at a designated or triggering instruction, e.g., a second designated or triggering instruction. If the speculative tail pointer at 435 is at a second designated or triggering instruction (435: Yes), then the process continues to 440 where the process 400 stops speculatively processing until in an embodiment at least the first designated or triggering instruction completes. When the first designated instruction completes, the process 400 after 440 continues by advancing the completion tail pointer in the ICT to the next-to-complete instruction in the ICT and looping back to 405. That is, the speculative tail pointer is set to coincide with the completion tail pointer and the processor looks through the ICT read port for a designated or triggering instruction at 405.

If at 435 it is determined that the speculative tail pointer is not pointed at a second designated or triggering instruction (435: No), then method 400 and processor continues to 445. At 445 it is determined whether the speculative tail pointer is pointing at an entry in the ICT that has a stop code. If at 445 the speculative tail pointer is pointed at an ICT entry that has a stop code (445: Yes), then at 440 speculative processing is stopped. In an embodiment, the process waits for the first designated instruction to finish and be ready-to-complete (RTC). In an embodiment, depending upon the logic of the processor, and the ICT, the process and processor waits until the stop code is cleared, and then the process 400 continues to 450.

If at 445, it is determined that the speculative tail pointer is pointed at an ICT entry that does not have a stop code (445: No), then the process 400 or processor continues to 450. At 450 it is determined whether the speculative tail pointer is pointing to an entry in the ICT that is a branch instruction. If the speculative tail pointer at 450 is pointing to a branch instruction in the ICT (450: Yes), then the process 400 and processor continues to 440 where speculative processing stops. The process 400 after 440 continues by waiting until the triggering or designated instruction is complete and advancing the completion tail pointer to the next-to-complete instruction in the ICT and looping back to 405. That is, the speculative tail pointer is set to coincide with the completion tail pointer and the processor looks through the ICT read port for a designated or triggering instruction at 405.

If at 450 it is determined that the entry pointed to by the speculative tail pointer, e.g., the entry read at 430, is not a branch instruction (450: No), then the process 400 continues to 455. At 455, it is determined whether the entry pointed to by the speculative tail pointer, e.g., the entry read at 430, is a store instruction. In an embodiment, the ICT has a bit that identifies store instructions in the ICT. If the entry read at 430 is determined to be a store instruction (e.g., 455: Yes), then at 460 the processor determines whether the store instruction is finished. In this regard, in an aspect, an instruction is finished if the LSU executes and finishes the store instruction. In an embodiment, the store instruction is finished when the LSU executes the store instruction, and the result of the store instruction, e.g., the store operation, is drained to memory, e.g., L1 and/or L2 cache. If at 460 the store is not finished (460: No), then the speculative process 400 stalls and waits at 462 until the store instruction is finished.

If at 460 the store instruction is evaluated and determined to be finished (460: Yes), then it is determined at 465 whether the store instruction is ready-to-complete (RTC). An instruction is ready-to-complete (RTC) in an embodiment when all entries of atomic (e.g., when group of instructions all need to be completed at the same time) are finished and no stop code is set. Additionally or alternatively, in an embodiment, RTC in the ICT will not be set unless the completion tail pointer is within the number of entries contained in the store queue (STQ), or some other designated number of entries. Limiting the number of entries capable of being set as RTC prevents releasing store instructions past a number of store tags and/or itags. Limiting the number of entries capable of being set as RTC can reduce or limit situations where the process advances the speculative release of stores too much, too far, and/or an undesirable amount in front of the next-to-complete instruction e.g., the completion tail pointer.

If the store instruction pointed to by the speculative tail pointer is not ready-to-complete (RTC) at 465, then the speculative process 400 stalls and waits at 467 until the store instruction pointed to by the speculative tail pointer is ready-to-complete (RTC). If the store instruction in the ICT pointed to by the speculative tail pointer at 465 is ready-to-complete (465: Yes), then at 470 the number of finished stores are reported to dispatch logic, e.g., broadcast to the LSU, and in an embodiment the stores are drained to the L1 and/or L2 cache, and additionally and/or alternatively, store queue entries associated with the stores drained to the L1 and/or L2 cache are released and deallocated in the store queue (STQ). The stores drained to the L1 and/or L2 cache are in an embodiment speculatively tracked in the L1 and/or L2 cache. In one or more embodiments, RTC is used to speculative release stores instructions in the store queue (STQ) instead of using store instructions finished by the LSU so that in response to the designated or triggering instruction finishing, all speculatively drained stores are completed in one cycle.

After 470 the process continues to 425 where the speculative tail pointer is advanced at the next cycle and the process 400 continues so that additional stores can be speculatively released. That is, after 470 the process continues to 425 where the speculative tail pointer is advanced to the next entry in the ICT. At 430 the next entry is read, and the process 400 continues to 435 where it is determined whether the speculative tail pointer is pointing at a second triggering instruction. If at 435 the speculative tail pointer is not pointing at a second triggering instruction (435: No), is not pointing at an entry with a stop code (445: No), and is not pointing at an entry that is a branch instruction (450: No), then the process again continues to 455.

If the speculative tail pointer at 455 is not pointing to a store instruction in the ICT (455: No), then the process 400 and/or processor continues to 485 where it is determined whether the instruction in the ICT pointed to by the speculative tail pointer is finished and ready-to-complete (RTC). If at 485 the instruction in the ICT is not finished and ready-to-complete (485: No), then at 490 the processor waits until the instruction is finished and RTC. If and when the instruction in the ICT pointed to by the speculative tail pointer is finished and RTC (485: Yes), then the process 400 continues to 425 where the speculative tail pointer is advanced to the next entry in the ICT, and the process continues to step 430 and the process 400 proceeds and repeats.

When store instructions are completed as indicated by the ICT, e.g., at completion time, the speculatively released store instructions (stags) are not reported to the dispatch unit or the LSU as these store instructions are no longer in the store queue (STQ). If the triggering or designated instruction finishes and is RTC during the speculative process, then the process and/or processor will undergo one or more responses. In one example, where the triggering or designated instruction is finished and ready-to-complete (RTC) and the response is favorable, e.g., does not indicated a failure or a problem, the triggering or designated instruction completes and the completion tail pointer moves to the next instruction. In another example, if the designated or triggering instruction fails or acknowledges a problem, the processor may undergo a flushing process as described below.

There are circumstances when the instructions in the load and store queues in the execution unit, for example, the LSU will need to be flushed. Typically each entry in the ICT 325 will contain one store bit and one load bit. When a range of ICT entries are being flushed, in an embodiment, the number of load bits and/or the number of store bits shall be counted and reported back to the Dispatch Unit 320. The Dispatch Unit will then subtract the number of flushed entries from the current stag or ltag count to determine what stag count or ltag count to resume the Dispatch Unit 320 with after the flush. At flush time, ICT 325 will count the number of flushed stag/ltag and recalculate the location of the pointers in the Issue Queue 330.

If the designated or triggering instruction fails, then, in an embodiment, a flush operation is performed and the speculatively released stores in the L1 and/or L2 cache are removed. In other words, in an embodiment, during a flush process, the speculatively released stores are erased, removed, and/or wiped out from the L1 and/or L2 cache. In an aspect, speculatively released stores that are flushed, are not reported to the Dispatch Unit and/or the LSU. At flush time, since the stores have already been finished and released (drained) to the L1 and/or L2 cache, and the store entries in the STQ deallocated, store instructions (stags) that have completed are not reported to the Dispatch Unit or the LSU. In addition, when the thread is flushed, the speculative tail pointer is set to the completion tail pointer. When a thread is completed, or flushed, the ICT entry pointed to by the speculative tail pointer is set to the completion tail pointer and read.

Figure 5A:
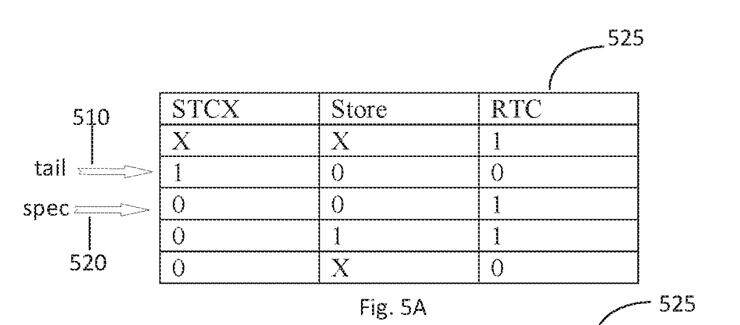
FIGS. 5A, 5B, and 5C illustrates a diagrammatic block diagram of an instruction completion table undergoing an example of a process according an embodiment of speculatively releasing store instruction during a series of cycles of a processor.
Figure 5B:
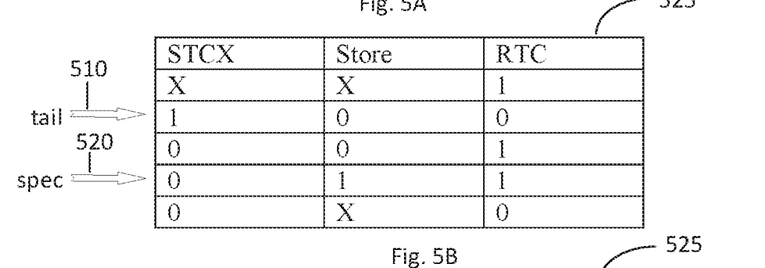
Figure 5C:
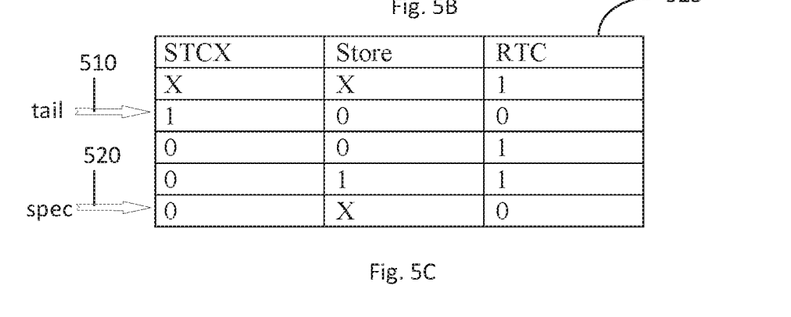

FIGS. 5A, 5B, and 5C are block diagrams of a portion of an ITC showing an example of a process speculatively releasing stores. FIGS. 5A, 5B, and 5C shows ITC 525 having a completion tail 510 and a speculative tail 520 with five instruction entries in the ICT 525. FIGS. 5A, 5B, and 5C track the progress in the ICT 525 of the speculative tail 520 and the completion tail 510 as the processor continues through three (3) clock cycles where FIG. 5A shows the ICT at clock cycle X+1, FIG. 5B shows the ICT at clock cycle X+2, and FIG. 5C shows the ICT at clock cycle X+3.

In the example of FIGS. 5A, 5B, and 5C, the ICT 525 tracks whether an instruction is a STCX instruction, where in the example, a STCX instruction is a triggering or designated instruction to start the process for speculative releasing store instructions in the store queue (STQ). In the example of FIGS. 5A, 5B, and 5C, the ICT also tracks whether an instruction is a store instruction and whether the instruction is ready-to-complete (RTC). The set of instructions is the same for each of FIGS. 5A, 5B, and 5C. The ICT 525 in FIGS. 5A, 5B, and 5C has a read port per thread for the speculative tail 520 to look through the entries in the ICT.

Applying the method of speculatively releasing stores as shown and explained in connection with FIG. 4, at the first cycle, clock X+1, the completion tail 510 at FIG. 5A is pointing at a STCX instruction which in this example is a designated or triggering signal/instruction. The designated or triggering instruction as shown in FIG. 5A is not ready-to-complete (RTC), so as per FIG. 4, 405 is a yes, 415 is a no, and 420 is a no, and the speculative releasing process starts and the speculative tail 520 advances as per 425 to the next instruction in ICT 525 as shown in FIG. 5A. The ICT entry pointed to by the speculative tail pointer 520 is read at 430 and in the example of FIG. 5A the ICT entry is not a STCX instruction (not second triggering instruction, 435: No), does not have a stop code (445: No), is not a branch instruction (450: No), is not a store instruction (455: No), and is ready-to-complete (RTC) (485: Yes), so the process goes to 425 where at the next cycle the speculative tail pointer advances to the next instruction in the ICT 525, as shown at FIG. 5B.

In FIG. 5B, at cycle X+2, the completion tail 510 remains on the STCX instruction while the speculative tail pointer 520 has advanced and the entry pointed to by the speculative tail pointer is read at 430. The entry that speculative tail pointer 520 points to in ICT 525 in FIG. 5B is not a second triggering instruction (435: No), does not have a stop code (445: No), and is not a branch instruction (450: No), but is a store instruction (435: Yes) and the instruction is RTC ((460: Yes) and (465: Yes)), so at 470 the number of store instructions to be speculatively released are broadcast by the ICT 525 to the dispatch unit and/or the LSU.

The speculative tail 520 at the next clock cycle (clock X+3) advances to the next entry in the ICT 525 as illustrated in FIG. 5C and as per flowchart of FIG. 4 the process proceeds after 470 to 425. At 425 the process continues to 430 and the speculative tail pointer entry is read as per 430.

The instruction entry pointed to by the speculative tail pointer is not a second designated or triggering instruction (435: No), does not have a stop code (445: No), is not a branch instruction (450: No), is not a store instruction (455: No) and is not RTC (485: No), so as per 490 the process stalls and waits until the instruction at the speculative tail 520 is ready to complete (RTC) and then resumes speculative processing where the process continues at 425 where the speculative tail pointer is advanced to the next ICT entry.

Figure 6:
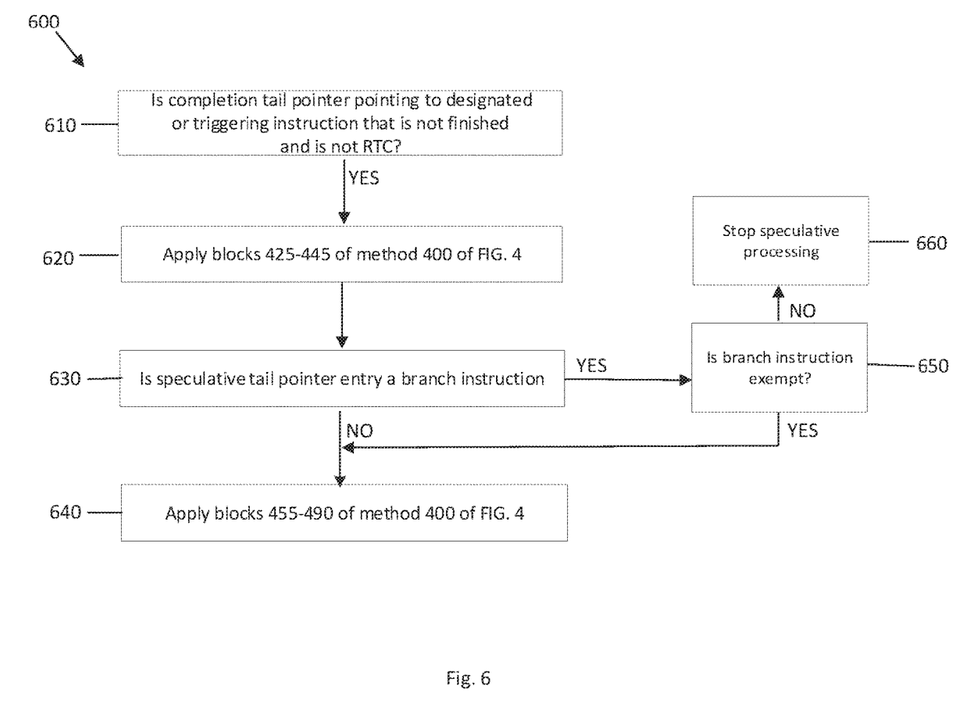
FIG. 6 illustrates a flow chart of an illustrative method of processing or handling data in a processor, and in an embodiment of speculatively releasing store instruction from a store queue in a load store execution unit.

FIG. 6 is an exemplary flowchart in accordance with one embodiment illustrating and describing a method of handling instructions in an information handling system, and more specifically a method of speculatively releasing store instructions from a store queue and/or speculatively releasing or draining stores to memory, e.g., L1 and/or L2 cache during a process, for example, in a processor, in accordance with an embodiment of the present disclosure. While the method 600 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 6, but the process may be integrated and/or one or more steps may be performed together, simultaneously, or the steps may be performed in the order disclosed or in an alternate order.

The method 600 of speculatively releasing store instructions proceeds similar to the flow chart shown and described in connection with FIG. 4, except the speculative process continues in response to branch instructions, and in illustrative examples, certain branch instructions. FIG. 6 shows a flow chart of an alternative to process step 450 in FIG. 4 where at 450 if the speculative tail pointer is a branch instruction, then method 400 undergoes an alternative process.

For example, certain branch instructions, e.g., exempt branch instructions, may be ignored and the process of speculatively releasing store instructions may be permitted after such certain (exempt) branch instructions. For example, a branch instruction that immediately follows a designated or triggering instruction may be ignored. For example, a branch instruction immediately following a STCX and/or HWSYNC instruction will not stop the speculative releasing process. The process in an embodiment is permitted to proceed past one branch instruction.

In method 600 in FIG. 6, at 610 it is determined whether the completion tail pointer in the ICT is pointing at a designated or triggering instruction that is not finished or RTC, and if so (610: Yes), then the process in an embodiment at 620 proceeds according to blocks 425-445 in method 400 of FIG. 4 until 450, where at 630 it is determined whether the speculative tail pointer entry is a pointing at branch instruction. If 630 is not a branch instruction (630: No), method 600 proceeds to 640 where the process proceeds according to steps 455-490 from the process of FIG. 4. If 630 is a branch instruction (630: Yes), process or processor continues to 650 where it is determined whether the branch instruction is an exempt branch instruction. If at 650 the branch instruction is not an exempt branch instruction (650: No), then the process continues to 660 where speculative processing stops. If at 650 it is determined that the branch instruction is exempt (650: Yes), then process 600 continues to 640.

In an embodiment, method 600 can be configured such that the speculative release of stores continues only past one exempt branch instruction and then the speculative releasing of store instructions freezes and stops releasing speculative stores. The Instruction Fetch Unit (IFU) and/or Dispatch Unit may be used to mark branches with a field code to identify exempt branches. For example, branch instructions can be marked with either a "00" or "11" to indicate whether the branch instruction is an exempt branch instruction. A marking of "00" can indicate that the branch instruction is exempt and so speculative processing can continue, or with "11" to indicate that speculative processing should be stopped.

While the illustrative embodiments described above are preferably implemented in hardware, such as in units and circuitry of a processor, various aspects of the illustrative embodiments may be implemented in software as well. For example, it will be understood that each block of the flowchart illustration in FIGS. 4 and 6, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems that perform the specified functions or steps, or by combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of processing data in a processor, comprising:
    determining whether an instruction is a designated instruction;
    determining whether an instruction following the designated instruction is a subsequent store instruction;
    speculatively releasing the subsequent store instruction while the designated instruction is pending and before the subsequent store instruction is complete;
    determining whether the designated instruction is ready-to-complete (RTC);
    in response to the designated instruction being RTC, stop speculatively releasing store instructions; and
    in response to the designated instruction not being RTC, initiate speculatively releasing subsequent store instructions.

2. The method according to claim 1, wherein in response to determining that an instruction is the designated instruction, initiating or advancing a speculative tail pointer in an instruction completion table (ICT) to look through the instructions in the ICT following the designated instruction.

3. The method according to claim 2, further comprising determining whether the instruction pointed to by the speculative tail pointer is a second designated instruction, and in response to the speculative tail pointer pointing to a second designated instruction, stop the speculative process, and in response to the speculative tail pointer not pointing to a second designated instruction, continue the speculative process.

4. The method according to claim 2, further comprising determining whether the instruction pointed to by the speculative tail pointer has a stop code, and in response to the instruction pointed to by the speculative tail pointer having a stop code, stop the speculative process, and in response to the instruction pointed to by the speculative tail pointer not having a stop code, continue the speculative process.

5. The method according to claim 2, further comprising determining whether the instruction pointed to by the speculative tail pointer is a branch instruction, and in response to the instruction pointed to by the speculative tail pointer being a branch instruction stop the speculative process, and in response to the instruction pointed to by the speculative tail pointer not being a branch instruction, continue the speculative process.

6. The method according to claim 5, further comprising determining whether the branch instruction pointed to by the speculative tail pointer is an exempt branch instruction, and in response to the branch instruction being an exempt branch instruction continue speculative processing, and in response to the instruction not being an exempt branch instruction, stop the speculative process.

7. The method according to claim 2, further comprising determining whether the instruction pointed to by the speculative tail pointer is ready-to-complete (RTC), and in response to the instruction pointed to by the speculative tail pointer not being RTC, wait until the instruction entry is RTC, and in response to the instruction pointed to by the speculative tail pointer being RTC, advance the speculative tail pointer and continue the speculative process.

8. The method according to claim 1, wherein the subsequent store instruction is released from a store queue in a load store unit (LSU) of a processor to memory.

9. The method according to claim 1, wherein the designated instruction comprises at least one of the group consisting of a STCX instruction and a HWSYNC instruction.

10. The method according to claim 1, further comprising determining whether the store instruction following the designated instruction is RTC, and in response to the store instruction not being RTC wait until the store instruction is RTC, and in response to the store instruction being RTC, report the number of store instructions to the LSU, and speculatively release those store instructions from a store queue.

11. The method according to claim 1, wherein the subsequent store instruction does not deallocate its entry in a store queue until the store operation corresponding to the subsequent store instruction has drained out to memory.

12. The method according to claim 11, wherein memory comprises at least one of the group consisting of L1 cache, L2 Cache, and combinations thereof.

13. A computer system for processing information, the computer system comprising:
    at least one computer processor comprising:
    a Dispatch Unit for dispatching instructions;
    a store queue for receiving store instructions, the store queue having a plurality of entry locations for storing data; and
    an Instruction Completion Table (ICT) having a plurality of instruction entries, the ICT for tracking the progress of instructions processed by the processor and to identify instructions that are ready-to-complete (RTC), the ICT having a completion tail pointer to identify the next-to-complete (NTC) instruction entry and a speculative tail pointer to look through the ICT instruction entries after the NTC instruction, wherein the processor is configured to:
speculatively release one or more store instructions from the store queue while a first designated instruction is pending in the ICT, and before the one or more store instructions complete;
determine whether the first designated instruction is ready-to-complete (RTC);
in response to the first designated instruction being RTC, stop speculatively releasing the one or more store instructions; and
in response to the first designated instruction not being RTC, initiate the speculatively releasing process.

14. The computer system of claim 13, wherein the first designated instruction comprises at least one of the group consisting of a STCX instruction and a HWSYNC instruction.

15. The computer system of claim 13, wherein the processor is configured to determine whether an instruction is the first designated instruction and in response to determining that an instruction is the first designated instruction, determine whether a subsequent instruction is a store instruction, and if a subsequent instruction is a store instruction, speculatively release the one or more store instructions from the store queue.

16. The computer system of claim 13, wherein the processor is further configured to stop speculatively releasing subsequent store instructions in response to determining that an instruction subsequent to the first designated instruction is at least one of the group consisting of a second designated instruction, a branch instruction, an instruction that has a stop code, and combinations thereof.

17. The computer system of claim 16, wherein the processor is further configured to speculatively release the one or more store instructions from the store queue in response to an exempt branch instruction.

18. A computer system for processing information, the computer system comprising:
at least one processor;
a Dispatch Unit for dispatching instructions;
an Issue Queue for receiving instructions dispatched from the Dispatch Unit and for issuing instructions;
a store queue of an execution unit for receiving one or more store instructions issued from the Issue Queue, the store queue having a plurality of entry locations for storing data;
an Instruction Completion Table (ICT) having a plurality of instruction entries, the ICT for tracking the progress of instructions processed by the processor and to identify instructions that are ready-to-complete (RTC), the ICT having a completion tail pointer to identify the next to complete (NTC) instruction entry and a speculative tail pointer to look through the ICT instruction entries after the NTC instruction;
one or more computer readable non-transitory storage media; and
programming instructions stored on the one or more computer readable non-transitory storage media for execution by the at least one processor, the programming instructions comprising:
programming instructions to speculatively release the one or more store instructions from the store queue before the store instructions is complete and while a first designated instruction is pending in the ICT;
programming instructions to determine whether the first designated instruction is ready-to-complete (RTC);
programming instructions to stop speculatively releasing the one or more store instruction in response to the first designated instruction being RTC; and
programming instructions to initiate the speculatively releasing process in response to the first designated instruction not being RTC.

* * * * *